United States Patent
Li et al.

(10) Patent No.: US 11,627,421 B1
(45) Date of Patent: Apr. 11, 2023

(54) METHOD FOR REALIZING HEARING AID FUNCTION BASED ON BLUETOOTH HEADSET CHIP AND A BLUETOOTH HEADSET

(71) Applicant: Shenzhen Tingduoduo Technology Co., Ltd., Shenzhen (CN)

(72) Inventors: Gaofeng Li, Shenzhen (CN); Jian Sun, Shenzhen (CN)

(73) Assignee: SHENZHEN TINGDUODUO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/949,270

(22) Filed: Sep. 21, 2022

(30) Foreign Application Priority Data

May 18, 2022 (CN) .......................... 202210537045.7

(51) Int. Cl.
*H04R 25/00* (2006.01)
*H04R 1/10* (2006.01)

(52) U.S. Cl.
CPC ......... *H04R 25/554* (2013.01); *H04R 1/1083* (2013.01); *H04R 25/505* (2013.01); *H04R 2225/43* (2013.01)

(58) Field of Classification Search
CPC .. H04R 25/554; H04R 1/1083; H04R 25/505; H04R 2225/43
USPC ....................................................... 381/315
See application file for complete search history.

(56) References Cited

FOREIGN PATENT DOCUMENTS

| CN | 103905945 | A | | 7/2014 |
|---|---|---|---|---|
| CN | 109859767 | A | | 6/2019 |
| CN | 112367600 | A | | 2/2021 |
| CN | 114640938 | A | * | 6/2022 |

OTHER PUBLICATIONS

CNIPA, Notification of a First Office Action for CN202210537045.7, dated Jul. 12, 2022.

(Continued)

*Primary Examiner* — Phylesha Dabney
(74) *Attorney, Agent, or Firm* — Zhigang Ma

(57) ABSTRACT

The invention discloses a method for realizing hearing aid function based on Bluetooth headset chip and a Bluetooth headset: the common Bluetooth headset chip software of Bluetooth headset is upgraded to a specific Bluetooth headset chip with hearing aid function by a hearing loss correction software; a hearing aid algorithm module is embedded into the development kit of the common Bluetooth headset chip in the form of software library by the hearing loss correction software, so that the common Bluetooth headset chip has the hearing aid function only by software upgrade; after being processed by the hearing aid algorithm module, a sound signal is output to a hearing-impaired user, so that the hearing-impaired user can use the common Bluetooth headset to realize the hearing aid function. For the Bluetooth headset, a special hearing aid chip does not need to be installed or any change does not need to be made to the headset hardwares, and the function and price can meet the needs of hearing-impaired users, so that the hearing impaired users can enjoy great convenience from such a Bluetooth headset without buying expensive special hearing aid.

6 Claims, 2 Drawing Sheets

(56) References Cited

OTHER PUBLICATIONS

Shenzhen Tingduoduo Technology Co., Ltd (Applicant), Reply to Notification of a First Office Action for CN202210537045.7, w/ (allowed) replacement claims, dated Jul. 15, 2022.
CNIPA, Notification to grant patent right for invention in CN202210537045.7, dated Jul. 29, 2022.

* cited by examiner

METHOD FOR REALIZING HEARING AID FUNCTION BASED ON BLUETOOTH HEADSET CHIP AND A BLUETOOTH HEADSET

BACKGROUND OF THE INVENTION

1. Field of the Invention

The invention relates to the technical field of hearing aid, in particular to a method for realizing hearing aid function based on Bluetooth headset chip, a Bluetooth headset and a computer readable storage medium.

2. Description of Related Art

The hearing aid can reduce noise and enhance human voice in terms of the sounds cannot be heard by hearing-impaired patients, then amplify the sounds, and finally make use of the residual hearing of hearing-impaired people to send the sounds to the auditory center of the brain so as to make the sounds heard, so that it brings great convenience to hearing-impaired people.

At present, there are many hearing-impaired users who cannot hear or hear others' words, music, broadcasts or various sounds such as alarms, doorbells, horns, prompts, etc. clearly just like normal people. Hearing impairment is difficult to cure, and it can only be solved by wearing of a hearing aid.

In the prior art, the key component of a hearing aid is a hearing aid chip, the hearing aid chip is used for moderately reducing the useless background noises, intelligently amplifying the sounds according to the hearing loss degree of hearing-impaired user, then reversely correcting the hearing according to the acoustic distortion degree of hearing-impaired user, and finally inputting the sounds to the speaker to be restored into sound signals (or bone conduction mode is used: inputting to the cheek bone where a vibrator passes through), so as to remedy the hearing loss of hearing-impaired people.

However, the hearing aid chip has been monopolized by a few merchants for a long time, so that the hearing aid in the market is very expensive. In the prior art, there are products that can be directly used as hearing aids by virtue of Bluetooth headsets, but these products are also very expensive because their hearing aid functions are generally realized by directly embedding the hearing aid chips into the Bluetooth headsets or changing the hardware structures of the Bluetooth headsets.

Therefore, the prior art needs to be improved and developed.

SUMMARY OF THE INVENTION

The main purpose of the invention is to provide a method for realizing hearing aid function based on Bluetooth headset chip, a Bluetooth headset and a computer readable storage medium, so as to solve the problem that hearing aid function cannot be realized without changing of the Bluetooth chip hardwares in the prior art.

To achieve the above purpose, the invention provides a method for realizing hearing aid function based on Bluetooth headset chip, and the method includes the following steps:

upgrading the common Bluetooth headset chip software of Bluetooth headset to a specific Bluetooth headset chip with hearing aid function by a hearing loss correction software;

the upgrading of the common Bluetooth headset chip of Bluetooth headset to a specific Bluetooth headset chip with hearing aid function by a hearing loss correction software specifically includes the following steps: a hearing aid algorithm module is embedded into the development kit of the common Bluetooth headset chip in the form of software library by a hearing loss correction software, so as to upgrade the common Bluetooth headset chip to a specific Bluetooth headset chip with hearing aid function;

wherein, the hearing aid algorithm module comprises a sound field recognition unit, an adaptive single-microphone noise suppression unit, a dynamic range compression unit, a spectrum shifting unit, a feedback suppression unit and an adaptive output gain control unit;

the microphone of the Bluetooth headset sends an external sound signal to the specific Bluetooth headset chip, and the specific Bluetooth headset chip converts the external sound signal into a digital signal through analog-to-digital conversion and sends the digital signal to the hearing aid algorithm module;

the sound field recognition unit performs mode recognition according to the digital signal to extract sound field characteristics, determines the current listening environment of user according to the sound field characteristics, and performs personalized processing according to the current listening environment;

the digital signal processed by the sound field recognition unit is input to the adaptive single-microphone noise suppression unit, and the adaptive single-microphone noise suppression unit adaptively tracks the change of environmental noise, and performs noise estimation and hierarchical noise suppression in real time;

the digital signal processed by the adaptive single-microphone noise suppression unit is input to the dynamic range compression unit, and the dynamic range compression unit limits the sound frequency band through compression, so that the sound frequency band is compressed to fall within the hearing threshold of user;

for specific hearing-impaired users, the digital signal processed by the dynamic range compression unit is input to the spectrum shifting unit, and the spectrum shifting unit shifts the high-frequency sound signal cannot be received to the low and medium frequency areas;

the digital signal processed by the dynamic range compression unit or the spectrum shifting unit is input to the feedback suppression unit, and the feedback suppression unit performs notch processing on the detected howling frequency point, so as to eliminate howling;

the digital signal processed by the feedback suppression unit is input to the adaptive output gain control unit, and the adaptive output gain control unit performs gain amplification according to a gain target, so as to control the amplitude of output gain;

the digital signal processed by the adaptive output gain control unit is converted into a sound signal and then the sound signal is sent to a speaker of the Bluetooth headset, and the speaker outputs sound;

In an optional embodiment, for the method for realizing hearing aid function based on Bluetooth headset chip, the specific Bluetooth headset chip is provided with common Bluetooth communication function and hearing aid function; the Bluetooth headset with the specific Bluetooth headset chip selectively turns on/off the hearing aid function according to a preset mode.

In an optional embodiment, for the method for realizing hearing aid function based on Bluetooth headset chip, the sound field recognition unit performs mode recognition according to the digital signal; the method also comprises the following aspects:

the usage scenarios are classified and stored in advance according to the noise environment, so that the sound field recognition unit can determine the usage scenario of user according to the noise of the current listening environment of user, and perform targeted processing according to different usage scenarios.

In an optional embodiment, for the method for realizing hearing aid function based on Bluetooth headset chip, the adaptive single-microphone noise suppression unit improves signal-to-noise ratio and signal intelligibility through noise estimation and hierarchical noise suppression.

In an optional embodiment, for the method for realizing hearing aid function based on Bluetooth headset chip, the dynamic range compression unit limits the sound frequency band through compression, specifically including the following step:

the dynamic range compression unit limits the maximum output power through compression to control the sound frequency band.

In an optional embodiment, for the method for realizing hearing aid function based on Bluetooth headset chip, the function of the spectrum shifting unit is turned on/off according to the hearing loss degree of user.

In addition, in order to achieve the above purpose, the invention also provides a Bluetooth headset, wherein the Bluetooth headset comprises a microphone, a common Bluetooth headset chip and a speaker, and also comprises a hearing aid algorithm module embedded in the common Bluetooth headset chip by a hearing loss correction software; the common Bluetooth headset chip with the hearing aid algorithm module embedded is upgraded to a specific Bluetooth headset chip;

The hearing aid algorithm module comprises a sound field recognition unit, an adaptive single-microphone noise suppression unit, a dynamic range compression unit, a spectrum shifting unit, a feedback suppression unit and an adaptive output gain control unit;

The sound field recognition unit is used for performing mode recognition according to the digital signal to extract sound field characteristics, determining the current listening environment of user according to the sound field characteristics, and performing personalized processing according to the current listening environment;

The adaptive single-microphone noise suppression unit is used for adaptively tracking the change of environmental noise, and performing noise estimation and hierarchical noise suppression in real time;

The dynamic range compression unit is used for limiting the sound frequency band through compression, so that the sound frequency band is compressed to fall within the hearing threshold of user;

The spectrum shifting unit is used for shifting the high-frequency sound signal cannot be received to the low and medium frequency areas;

The feedback suppression unit is used for performing notch processing on the detected howling frequency point, so as to eliminate howling;

The adaptive output gain control unit is used for performing gain amplification according to a gain target, so as to control the amplitude of output gain;

In an optional embodiment, for the Bluetooth headset, the microphone is used for sending an external sound signal to the specific Bluetooth headset chip, and the specific Bluetooth headset chip converts the external sound signal into a digital signal through analog-to-digital conversion and sends the digital signal to the hearing aid algorithm module.

In an optional embodiment, for the Bluetooth headset, the adaptive output gain control unit converts the processed digital signal into a sound signal and sends the sound signal to the speaker, and the speaker is used for outputting sound;

In addition, in order to achieve the above purpose, the invention also provides a computer readable storage medium, wherein the computer readable storage medium stores programs for realizing hearing aid function based on Bluetooth headset chip, and when the programs for realizing hearing aid function based on Bluetooth headset chip is executed by a processor, all of the above steps of the method for realizing hearing aid function based on Bluetooth headset chip are performed.

In the invention, the common Bluetooth headset chip of Bluetooth headset is upgraded to a specific Bluetooth headset chip with hearing aid function by a hearing loss correction software; a hearing aid algorithm module is embedded into the development kit of the common Bluetooth headset chip in the form of software library by the hearing loss correction software, so that the common Bluetooth headset chip has the hearing aid function only by software upgrade; after the sound signal input from the microphone is processed by the hearing aid algorithm module, a sound is output to a hearing-impaired user through the speaker, so that the hearing-impaired user can use the common Bluetooth headset to realize the hearing aid function. For the Bluetooth headset, a special hearing aid chip does not need to be installed or any change does not need to be made to the headset hardwares, and the function and price can meet the needs of hearing-impaired users, so that the hearing impaired users can enjoy great convenience from such a Bluetooth headset without buying expensive special hearing aid.

DETAILED DESCRIPTION OF THE PREFERRED EMBODIMENTS

In order to make the purpose, technical scheme and advantages of the invention clearer and more definite, the invention is further explained in detail by the figures and embodiments. It should be understood that the specific embodiments described herein are only for explaining the invention, but not for defining the invention.

Figure 1:
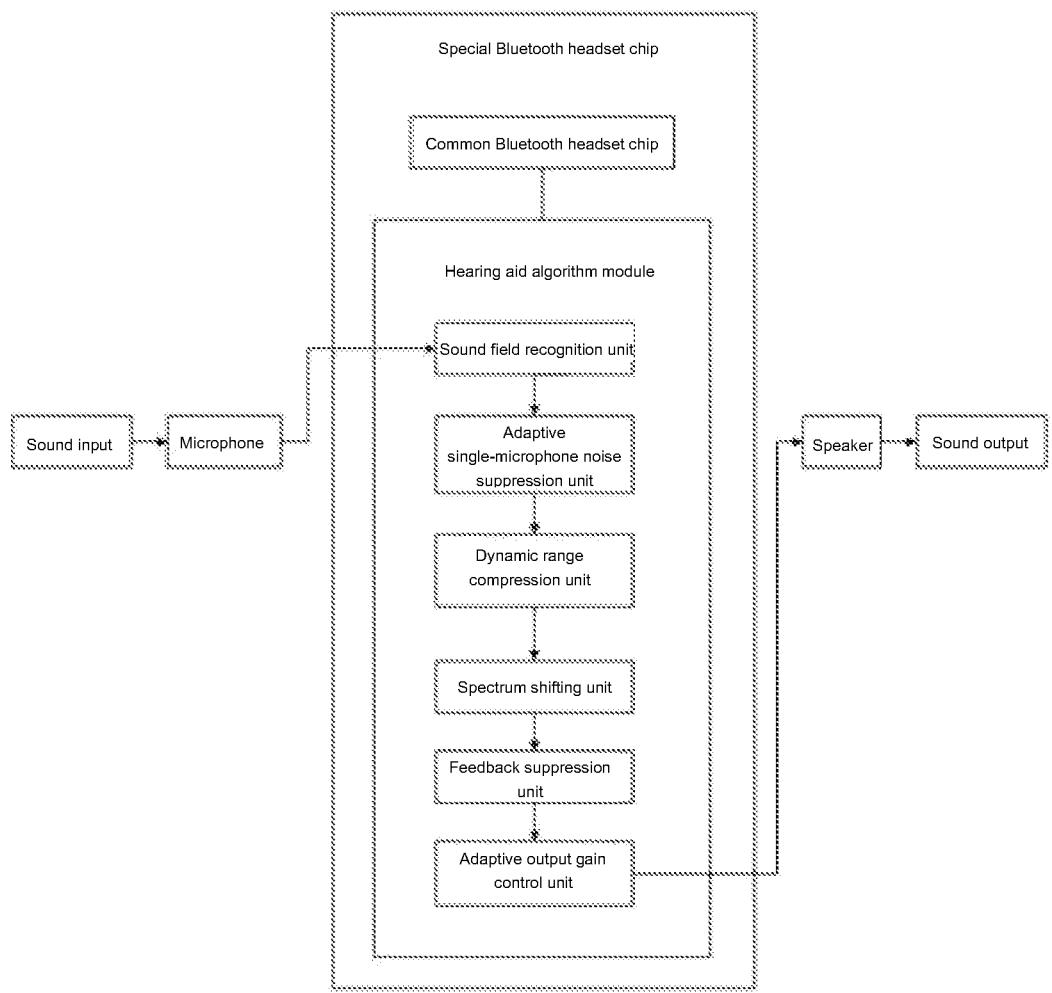
FIG. 1 is a schematic diagram for the principle of a preferred embodiment of the Bluetooth headset with hearing aid function in the invention.
Figure 2:
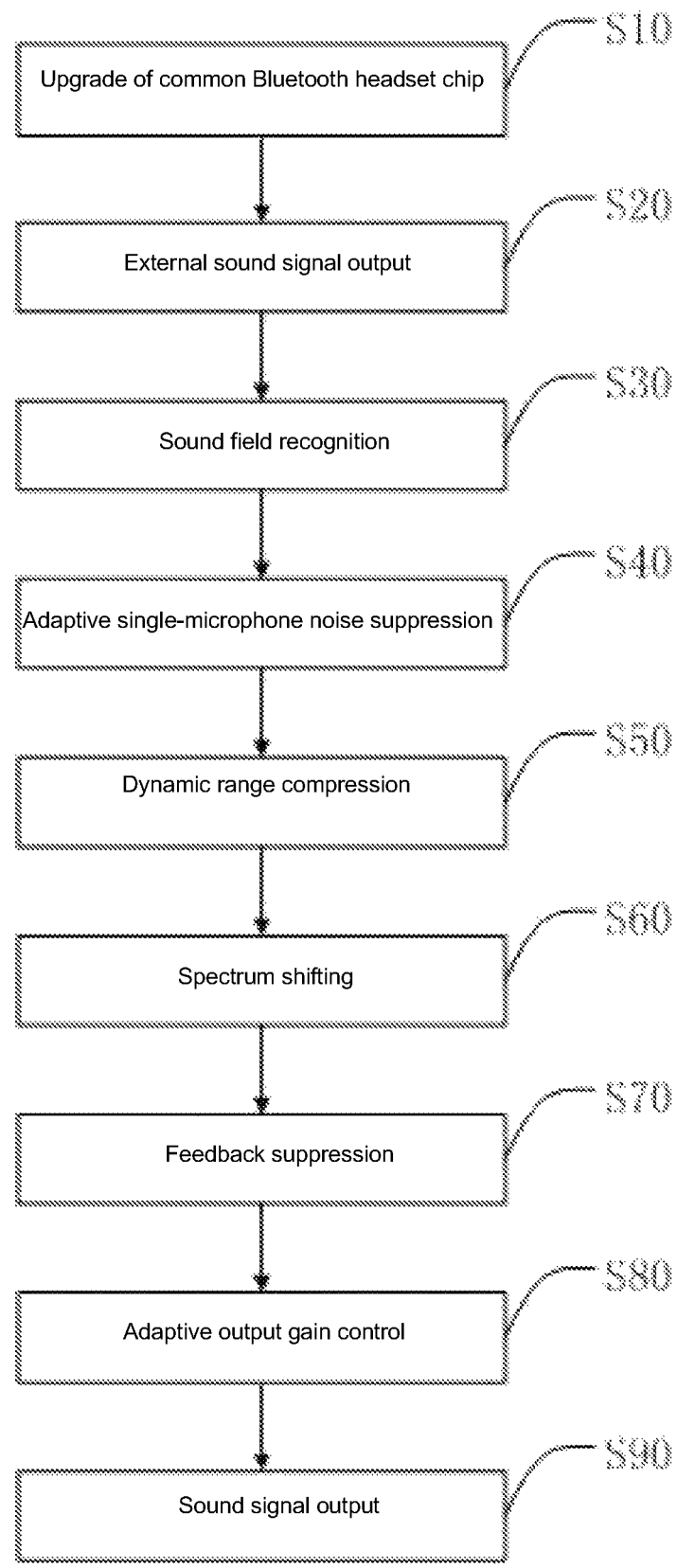
FIG. 2 is a flowchart for a preferred embodiment of the method for realizing hearing aid function based on Bluetooth headset chip in the invention.

The method for realizing hearing aid function based on Bluetooth headset chip in the preferred embodiments of the invention is shown in FIGS. 1 and 2, and the method includes the following steps:

S10, Upgrading the common Bluetooth headset chip software of Bluetooth headset to a specific Bluetooth headset chip with hearing aid function by a hearing loss correction software.

Specifically, the technical scheme of the invention is that the common Bluetooth headset chip (one of various universal Bluetooth headset chips) is upgraded by the hearing loss correction software to have the function of hearing aid chip while retaining original Bluetooth communication function, so that a special hearing aid chip does not need to be used; the common Bluetooth headset chip can achieve the function of hearing aid chip, without any change made to Bluetooth chip no matter the common Bluetooth headset chip is based on RISCV/ARM/MIPS or any other structure. Therefore, in the invention, a hearing aid algorithm module is embedded into the development kit of the common Bluetooth headset chip in the form of software library by the hearing loss correction software (the software upgrade has been commercialized on a large scale and completely made in China), so as to upgrade the common Bluetooth headset chip to a specific Bluetooth headset chip with hearing aid function, without any improvement in chip hardware in the whole process.

As shown in FIG. 1, the hearing aid algorithm module comprises a sound field recognition unit, an adaptive single-microphone noise suppression unit, a dynamic range compression unit, a spectrum shifting unit, a feedback suppression unit and an adaptive output gain control unit.

After being embedded into the development kit of the common Bluetooth headset chip in the form of software library, the hearing aid algorithm module is closely connected with a bottom-layer driver, with a delay of the whole path controlled within 20 ms, in other words, the functions of six units of the hearing aid algorithm module are embedded into the development kit of the common Bluetooth headset chip within the time, then the common Bluetooth headset chip can be upgraded to a specific Bluetooth headset chip with hearing aid function to have the hearing aid function.

S20, The microphone of the Bluetooth headset sends an external sound signal to the specific Bluetooth headset chip, and the specific Bluetooth headset chip converts the external sound signal into a digital signal through analog-to-digital conversion and sends the digital signal to the hearing aid algorithm module.

Specifically, the microphone (MIC) of the Bluetooth headset acquires an external sound signal of surrounding environment and sends the external sound signal to the specific Bluetooth headset chip, and the specific Bluetooth headset chip converts the external sound signal into a digital signal through analog-to-digital conversion (A/D conversion) and then sends the digital signal to the hearing aid algorithm module, so as to enter the processing flow of hearing aid function.

Wherein, the specific Bluetooth headset chip is provided with common Bluetooth communication function and hearing aid function; the Bluetooth headset with the specific Bluetooth headset chip selectively turns on/off the hearing aid function according to a preset mode (e.g. touch, double clicking of induction area by finger, and button switching), that is, users can choose to turn on/off the hearing aid function of the Bluetooth headset according to their needs, and when the hearing aid function of the Bluetooth headset is turned off, all original functions of the Bluetooth chip are not affected.

It should be noted that the Bluetooth headset with hearing aid function has three processing modes to select (various selection modes such as different touch selections and button selections), namely transparent mode, talk mode and hearing aid mode; in the transparent mode, the digital sound signal is transmitted to the player (speaker) after being subjected to simple filtering processing to be played out, and then a user can hear the original external sound signal; in the talk mode, the digitized digital sound signal is encoded and compressed and then transmitted to the opposite terminal through Bluetooth and communication network (for example, talk to the other party through Bluetooth headset); in the hearing aid mode, the sound signal enters the hearing aid algorithm module to be subjected to hearing aid processing.

S30, The sound field recognition unit performs mode recognition according to the digital signal to extract sound field characteristics, determines the current listening environment of user according to the sound field characteristics, and performs personalized processing according to the current listening environment.

Specifically, when the Bluetooth headset is in the hearing aid mode, the sound signal enters the front-end sound field recognition unit first; the sound field recognition algorithm is a simplified module obtained based on big data training, and it adopts mode recognition to extract the sound field characteristics to the greatest extent by consuming little resource, and then match the corresponding following algorithm processing flow.

Furthermore, the usage scenarios (e.g. quiet indoor environment, raucous restaurant environment and noisy roadside environment) are classified and stored in advance according to the noise environment, so that the sound field recognition unit can determine the usage scenario of user according to the noise of the current listening environment of user, and perform targeted processing according to different usage scenarios (sound processing degrees and modes are different in different usage scenarios), namely, adaptively allocate appropriate processing programs to complete personalized processing in different scenarios.

S40, The digital signal processed by the sound field recognition unit is input to the adaptive single-microphone noise suppression unit, and the adaptive single-microphone noise suppression unit adaptively tracks the change of environmental noise, and performs noise estimation and hierarchical noise suppression in real time.

Specifically, the adaptive single-microphone noise suppression unit can adaptively and quickly track the change of environmental noise and suppress the environmental noise; the adaptive single-microphone noise suppression unit can achieve good tracking and processing results through a short-delay processing algorithm, especially for some unstable noises difficult to be processed. The adaptive single-microphone noise suppression unit improves the signal-to-noise ratio and signal intelligibility through noise estimation and hierarchical noise suppression.

For the sound signal subjected to noise reduction, the signal-to-noise ratio is greatly improved.

S50, The digital signal processed by the adaptive single-microphone noise suppression unit is input to the dynamic range compression unit, and the dynamic range compression unit limits the sound frequency band through compression, so that the sound frequency band is compressed to fall within the hearing threshold of user.

Specifically, the main function of the dynamic range compression unit is to limit the maximum output power through compression, so that sound signal is compressed to fall within the hearing threshold (the maximum loudness of sound is limited to a certain extent) of hearing-impaired patient, that is, limit the maximum output power through compression to control sound frequency band, so that the sound frequency band is compressed to fall within the hearing threshold of user.

S60, For specific hearing-impaired users, the digital signal processed by the dynamic range compression unit is input to the spectrum shifting unit, and the spectrum shifting unit shifts the high-frequency sound signal cannot be received to the low and medium frequency areas.

Specifically, the function of spectrum shifting unit is optional and mainly for the hearing-impaired people with heavy loss or no residual hearing in the high-frequency area; the spectrum shifting unit shifts the high-frequency sound signal cannot be received by the hearing-impaired people to the low and medium frequency areas with good residual hearing, so as to achieve a better compensation effect. This function is optional according to the hearing loss degree of hearing-impaired people, i.e., it is selectively turned on/off (for example, turned on/off by interface parameters), and it does not need to be turned on when unnecessary, because the shifting of spectrum actually changes sound frequency so that the general users feel the distortion of sound.

S70, The digital signal processed by the dynamic range compression unit or the spectrum shifting unit is input to the feedback suppression unit, and the feedback suppression unit performs notch processing on the detected howling frequency point, so as to eliminate howling.

Specifically, complete isolation cannot be realized due to a too close distance between the microphone and the speaker, so it is easy to cause feedback howling when the gain is large. The feedback suppression unit can simultaneously detect 20 howling frequency points and perform notch processing (on the howling of 60 dB at most), so as to eliminate howling.

S80, The digital signal processed by the feedback suppression unit is input to the adaptive output gain control unit, and the adaptive output gain control unit performs gain amplification according to a gain target, so as to control the amplitude of output gain.

Specifically, the main function of the adaptive output gain control unit is to automatically control the amplitude of output gain. After the digital signal processed by the feedback suppression unit is input to the adaptive output gain control unit, the adaptive output gain control unit performs gain amplification according to a preset gain target, so as to control the amplitude of output gain.

S90, The digital signal processed by the adaptive output gain control unit is converted into a sound signal and then the sound signal is sent to a speaker of the Bluetooth headset, and the speaker outputs sound.

Specifically, after being processed by the six units of the hearing aid algorithm module, a digital signal is converted into a sound signal and the sound signal is sent to a speaker (a kind of player) of the Bluetooth headset, and the speaker outputs sound, so that the user can hear the sound subjected to hearing aid processing.

In the invention, the practice that a special hardware chip is always used as a hearing aid chip traditionally is abandoned, the function of hearing aid chip is realized only by upgrading the common Bluetooth headset chip (RISCV/ARM/MIPS) to the Bluetooth headset chip with hearing aid function by a hearing loss correction software, without any change to the original hardwares of Bluetooth headset, thus greatly reducing the price of purchasing a special hearing aid, thoroughly breaking the monopoly of a few hearing aid chip manufacturers for many years, lowering the high price of a hearing aid to the price of a common electronic product, improving the life quality of the majority of hearing-impaired patients and reducing the purchase cost.

Furthermore, as shown in FIG. 1, the invention also provides a Bluetooth headset, wherein the Bluetooth headset comprises a microphone, a common Bluetooth headset chip and a speaker, and also comprises a hearing aid algorithm module embedded in the common Bluetooth headset chip by a hearing loss correction software; the common Bluetooth headset chip with the hearing aid algorithm module embedded is upgraded to a specific Bluetooth headset chip.

Wherein, the hearing aid algorithm module comprises a sound field recognition unit, an adaptive single-microphone noise suppression unit, a dynamic range compression unit, a spectrum shifting unit, a feedback suppression unit and an adaptive output gain control unit.

Wherein, the sound field recognition unit is used for performing mode recognition according to the digital signal to extract sound field characteristics, determining the current listening environment of user according to the sound field characteristics, and performing personalized processing according to the current listening environment.

Wherein, the adaptive single-microphone noise suppression unit is used for adaptively tracking the change of environmental noise, and performing noise estimation and hierarchical noise suppression in real time.

Wherein, the dynamic range compression unit is used for limiting the sound frequency band through compression, so that the sound frequency band is compressed to fall within the hearing threshold of user.

Wherein, the spectrum shifting unit is used for shifting the high-frequency sound signal cannot be received to the low and medium frequency areas.

Wherein, the feedback suppression unit is used for performing notch processing on the detected howling frequency point, so as to eliminate howling.

Wherein, the adaptive output gain control unit is used for performing gain amplification according to a gain target, so as to control the amplitude of output gain.

Specifically, the microphone is used for sending an external sound signal to the specific Bluetooth headset chip, and the specific Bluetooth headset chip converts the external sound signal into a digital signal through analog-to-digital conversion and sends the digital signal to the hearing aid algorithm module; the sound field recognition unit in the hearing aid algorithm module performs mode recognition according to the digital signal to extract sound field characteristics, determines the current listening environment of user according to the sound field characteristics, and performs personalized processing according to the current listening environment; the digital signal processed by the sound field recognition unit is input to the adaptive single-microphone noise suppression unit, and the adaptive single-microphone noise suppression unit adaptively tracks the change of environmental noise, and performs noise estimation and hierarchical noise suppression in real time; the digital signal processed by the adaptive single-microphone noise suppression unit is input to the dynamic range compression unit, and the dynamic range compression unit limits the sound frequency band through compression, so that the sound frequency band is compressed to fall within the hearing threshold of user; for specific hearing-impaired users, the digital signal processed by the dynamic range compression unit is input to the spectrum shifting unit, and the spectrum shifting unit shifts the high-frequency sound signal cannot be received to the low and medium frequency areas; the digital signal processed by the dynamic range compression unit or the spectrum shifting unit is input to the feedback suppression unit, and the feedback suppression unit performs notch processing on the detected howling frequency point, so as to eliminate howling; the digital signal processed by the feedback suppression unit is input to the adaptive output gain control unit, and the adaptive output gain control unit performs gain amplification according to a gain target, so as to control the amplitude of output gain; the digital signal processed by the adaptive output gain control unit is converted into a sound signal and then the sound signal is sent to a speaker of the Bluetooth headset, and the speaker outputs sound.

The invention also provides a computer readable storage medium, wherein the computer readable storage medium stores programs for realizing hearing aid function based on Bluetooth headset chip, and when the programs for realizing hearing aid function based on Bluetooth headset chip is executed by a processor, all of the above steps of the method for realizing hearing aid function based on Bluetooth headset chip are performed.

To sum up, the invention provides a method for realizing hearing aid function based on Bluetooth headset chip and a Bluetooth headset, wherein the method includes the following steps: the common Bluetooth headset chip software of Bluetooth headset is upgraded to a specific Bluetooth headset chip with hearing aid function by a hearing loss correction software; a hearing aid algorithm module is embedded into the development kit of the common Bluetooth headset chip in the form of software library by the hearing loss correction software, so that the common Bluetooth headset chip has the hearing aid function only by software upgrade; after the sound signal input from the microphone is processed by the hearing aid algorithm module, a sound is output to a hearing-impaired user through the speaker, so that the hearing-impaired user can use the common Bluetooth headset to realize the hearing aid function. For the Bluetooth headset, a special hearing aid chip does not need to be installed or any change does not need to be made to the headset hardwares, and the function and price can meet the needs of hearing-impaired users, so that the hearing impaired users can enjoy great convenience from such a Bluetooth headset without buying expensive special hearing aid.

It should be noted that in this text, the term "comprise", "include" or any other variation thereof is intended to cover non-exclusive inclusion, so that a process, method, article or device that includes a series of elements not only includes these elements, but also includes other elements not explicitly listed, or also includes inherent elements of such process, method, article or device. Without other restrictions, for an element defined by the statement "include a (an) . . . ", it does not exclude the existence of another identical element in the process, method, article or device that includes the element.

Certainly, those skilled in the art can understand that all or part of the processes of the method in the above embodiments can be completed by computer programs instructing related hardwares (e.g. processor and controller), wherein the computer programs can be stored in a computer readable storage medium, and the programs can include the processes of the method in the above embodiments when executed. The computer readable storage medium can be a memory, a magnetic disk or an optical disk.

It should be understood that the application of the invention is not limited to the above embodiments, those skilled in the art can make improvements or changes according to the above description, and all of these improvements or changes should fall within the protection scope of the appended claims of the invention.

What is claimed is:

1. A method for realizing hearing aid function based on Bluetooth headset chip, and the method includes the following steps:

upgrading the common Bluetooth headset chip software of Bluetooth headset to a specific Bluetooth headset chip with hearing aid function by a hearing loss correction software;

the upgrading of the common Bluetooth headset chip of Bluetooth headset to the specific Bluetooth headset chip with hearing aid function by a hearing loss correction software specifically includes the following step: a hearing aid algorithm module is embedded into the development kit of the common Bluetooth headset chip in the form of software library by the hearing loss correction software, so as to upgrade the common Bluetooth headset chip to a specific Bluetooth headset chip with hearing aid function;

wherein, the hearing aid algorithm module comprises a sound field recognition unit, an adaptive single-microphone noise suppression unit, a dynamic range compression unit, a spectrum shifting unit, a feedback suppression unit and an adaptive output gain control unit;

the microphone of the Bluetooth headset sends an external sound signal to the specific Bluetooth headset chip, and the specific Bluetooth headset chip converts the external sound signal into a digital signal through analog-to-digital conversion and sends the digital signal to the hearing aid algorithm module;

the sound field recognition unit performs mode recognition according to the digital signal to extract sound field characteristics, determines the current listening environment of user according to the sound field characteristics, and adaptively allocates appropriate processing programs according to the current listening environment, so as to complete personalized processing in different scenarios;

the digital signal processed by the sound field recognition unit is input to the adaptive single-microphone noise suppression unit, and the adaptive single-microphone noise suppression unit adaptively tracks the change of environmental noise, and performs noise estimation and hierarchical noise suppression in real time; the adaptive single-microphone noise suppression unit improves the signal-to-noise ratio and signal intelligibility through noise estimation and hierarchical noise suppression;

the digital signal processed by the adaptive single-microphone noise suppression unit is input to the dynamic range compression unit, and the dynamic range compression unit limits the sound frequency band through compression, so that the sound frequency band is compressed to fall within the hearing threshold of user;

the dynamic range compression unit limits the sound frequency band through compression, specifically including the following step:

the dynamic range compression unit limits the maximum output power through compression to control the sound frequency band, so that the sound frequency band is compressed to fall within the hearing threshold of user;

for specific hearing-impaired users, the digital signal processed by the dynamic range compression unit is input to the spectrum shifting unit, and the spectrum shifting unit shifts the high-frequency sound signal cannot be received to the low and medium frequency areas;

the digital signal processed by the dynamic range compression unit or the spectrum shifting unit is input to the feedback suppression unit, and the feedback suppression unit performs notch processing on the detected howling frequency point, so as to eliminate howling;

the digital signal processed by the feedback suppression unit is input to the adaptive output gain control unit, and the adaptive output gain control unit performs gain amplification according to a gain target, so as to control the amplitude of output gain;

the digital signal processed by the adaptive output gain control unit is converted into a sound signal and then the sound signal is sent to a speaker of the Bluetooth headset, and the speaker outputs sound;

the Bluetooth headset with hearing aid function has three processing modes, i.e., transparent mode, talk mode and hearing aid mode; in the transparent mode, a digital sound signal is transmitted to a player after being subjected to simple filtering processing to be played out, and then a user can hear the original external sound signal; in the talk mode, the digitized digital sound signal is encoded and compressed and then transmitted to the opposite terminal through Bluetooth and communication network; in the hearing aid mode, the sound signal enters the hearing aid algorithm module to be subjected to hearing aid processing;

the function and price of Bluetooth headset with hearing aid function meet the needs of hearing-impaired users.

2. The method for realizing hearing aid function based on Bluetooth headset chip according to claim 1, wherein the specific Bluetooth headset chip is provided with common Bluetooth communication function and hearing aid function; the Bluetooth headset with the specific Bluetooth headset chip selectively turns on/off the hearing aid function according to a preset mode.

3. The method for realizing hearing aid function based on Bluetooth headset chip according to claim 1, wherein the sound field recognition unit performs mode recognition according to the digital signal; the method also comprises the following aspects:

the usage scenarios are classified and stored in advance according to the noise environment, so that the sound field recognition unit can determine the usage scenario of user according to the noise of the current listening environment, and perform targeted processing according to different usage scenarios.

4. The method for realizing hearing aid function based on Bluetooth headset chip according to claim 1, wherein the function of the spectrum shifting unit is selectively turned on/off according to the hearing loss degree of user.

5. A Bluetooth headset, wherein the Bluetooth headset comprises a microphone, a common Bluetooth headset chip and a speaker, and also comprises a hearing aid algorithm module embedded in the common Bluetooth headset chip by a hearing loss correction software; the common Bluetooth headset chip with the hearing aid algorithm module embedded is upgraded to a specific Bluetooth headset chip;

the microphone is used for sending an external sound signal to the specific Bluetooth headset chip, and the specific Bluetooth headset chip converts the external sound signal into a digital signal through analog-to-digital conversion and sends the digital signal to the hearing aid algorithm module;

the hearing aid algorithm module comprises a sound field recognition unit, an adaptive single-microphone noise suppression unit, a dynamic range compression unit, a spectrum shifting unit, a feedback suppression unit and an adaptive output gain control unit;

the sound field recognition unit is used for performing mode recognition according to the digital signal to extract sound field characteristics, determining the current listening environment of user according to the sound field characteristics, and adaptively allocating appropriate processing programs according to the current listening environment, so as to complete personalized processing in different scenarios;

the adaptive single-microphone noise suppression unit is used for adaptively tracking the change of environmental noise, and performing noise estimation and hierarchical noise suppression in real time; the adaptive single-microphone noise suppression unit improves the signal-to-noise ratio and signal intelligibility through noise estimation and hierarchical noise suppression;

the dynamic range compression unit is used for limiting sound frequency band through compression, so that the sound frequency band is compressed to fall within the hearing threshold of user; the dynamic range compression unit limits the maximum output power through compression to control the sound frequency band, so that the sound frequency band is compressed to fall within the hearing threshold of user;

the spectrum shifting unit is used for shifting the high-frequency sound signal cannot be received to the low and medium frequency areas;

the feedback suppression unit is used for performing notch processing on the detected howling frequency point, so as to eliminate howling;

the adaptive output gain control unit is used for performing gain amplification according to a gain target, so as to control the amplitude of output gain;

the adaptive output gain control unit converts the processed digital signal into a sound signal and sends the sound signal to the speaker, and the speaker is used for outputting sound;

the Bluetooth headset with hearing aid function has three processing modes, i.e., transparent mode, talk mode and hearing aid mode; in the transparent mode, a digital sound signal is transmitted to a player after being subjected to simple filtering processing to be played out, and then a user can hear the original external sound signal; in the talk mode, the digitized digital sound signal is encoded and compressed and then transmitted to the opposite terminal through Bluetooth and communication network; in the hearing aid mode, the sound signal enters the hearing aid algorithm module to be subjected to hearing aid processing;

the function and price of Bluetooth headset with hearing aid function meet the needs of hearing-impaired users.

6. A computer readable storage medium, wherein the computer readable storage medium stores programs for realizing hearing aid function based on Bluetooth headset chip, and when the programs for realizing hearing aid function based on Bluetooth headset chip is executed by a processor, the steps of the method for realizing hearing aid function based on Bluetooth headset chip according to claim 1 are performed.

* * * * *